(12) United States Patent
Maliassov et al.

(10) Patent No.: US 9,594,186 B2
(45) Date of Patent: Mar. 14, 2017

(54) METHOD AND SYSTEM FOR PARTITIONING PARALLEL SIMULATION MODELS

(75) Inventors: Serguei Maliassov, Spring, TX (US); Robert R. Shuttleworth, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 162 days.

(21) Appl. No.: 13/509,527

(22) PCT Filed: Oct. 19, 2010

(86) PCT No.: PCT/US2010/053141
§ 371 (c)(1),
(2), (4) Date: May 11, 2012

(87) PCT Pub. No.: WO2011/100002
PCT Pub. Date: Aug. 18, 2011

(65) Prior Publication Data
US 2012/0296619 A1    Nov. 22, 2012

Related U.S. Application Data

(60) Provisional application No. 61/304,056, filed on Feb. 12, 2010.

(51) Int. Cl.
*G01V 99/00*    (2009.01)
*E21B 43/00*    (2006.01)
(Continued)

(52) U.S. Cl.
CPC .............. *G01V 99/00* (2013.01); *E21B 43/00* (2013.01); *G01V 11/00* (2013.01);
(Continued)

(58) Field of Classification Search
None
See application file for complete search history.

(56) References Cited

U.S. PATENT DOCUMENTS 4,794,534 A   12/1988   Millheim
5,905,657 A   5/1999    Celniker
(Continued)

FOREIGN PATENT DOCUMENTS

EP    1 036 341        2/2005
WO    WO 2007/007210   1/2007
(Continued)

OTHER PUBLICATIONS

Karypis, G.; Kumar, V., "METIS A Software Package for Partitioning Unstructured Graphs, Partitioning Meshes, and Computing Fill-Reducing Orderings of Sparse Matrices—Version 4.0", University of Minnesota, Department of Computer Science, Sep. 20, 1998, 44 pages.*

(Continued)

*Primary Examiner* — Aniss Chad
*Assistant Examiner* — David M Rogers
(74) *Attorney, Agent, or Firm* — ExxonMobil Upstream Research-Law Department

(57) ABSTRACT

A method is presented for partitioning a simulation model into a plurality of subdomains that may each be assigned to one of a plurality of processors. The method includes creating a representation of a topology graph of a simulation model in a tangible, computer readable medium. The topology graph includes a plurality of computational elements and a plurality of connections between those elements. Each of the plurality of connections is weighted to create a plurality of weights, and each of the plurality of weights is scaled. Optionally, the weights can be mapped to different interval of values. Based on the weights information the (Continued)

topology graph is partitioned into two or more subdomains, wherein a partition boundary follows a local topographical minimum in the topology graph. A subdomain is assigned to each of the plurality of processors.

14 Claims, 9 Drawing Sheets

(51) Int. Cl.
  *G01V 11/00* (2006.01)
  *G06F 17/50* (2006.01)
(52) U.S. Cl.
  CPC .......... *G01V 2210/66* (2013.01); *G06F 17/50* (2013.01); *G06F 2217/16* (2013.01)

(56) References Cited

U.S. PATENT DOCUMENTS

| | | | |
|---|---|---|---|
| 6,002,985 A | 12/1999 | Stephenson | |
| 6,018,497 A * | 1/2000 | Gunasekera | G01V 1/28 367/38 |
| 6,049,758 A | 4/2000 | Bunks et al. | |
| 6,101,447 A | 8/2000 | Poe, Jr. | |
| 6,236,942 B1 | 5/2001 | Bush | |
| 6,295,504 B1 * | 9/2001 | Ye et al. | 702/7 |
| 6,356,844 B2 | 3/2002 | Thomas et al. | |
| 6,438,069 B1 | 8/2002 | Ross et al. | |
| 6,529,833 B2 | 3/2003 | Fanini et al. | |
| 6,549,854 B1 | 4/2003 | Malinverno et al. | |
| 6,612,382 B2 | 9/2003 | King | |
| 6,715,551 B2 | 4/2004 | Curtis et al. | |
| 6,772,066 B2 | 8/2004 | Cook | |
| 6,826,483 B1 | 11/2004 | Anderson et al. | |
| 6,978,210 B1 | 12/2005 | Suter et al. | |
| 6,980,940 B1 | 12/2005 | Gurpinar et al. | |
| 7,047,170 B2 | 5/2006 | Feldman et al. | |
| 7,054,752 B2 | 5/2006 | Zabalza-Mezghani et al. | |
| 7,085,696 B2 | 8/2006 | King | |
| 7,089,167 B2 | 8/2006 | Poe | |
| 7,109,717 B2 | 9/2006 | Constable | |
| 7,225,078 B2 | 5/2007 | Shelley et al. | |
| 7,277,796 B2 | 10/2007 | Kuchuk et al. | |
| 7,278,496 B2 | 10/2007 | Leuchtenberg | |
| 7,328,107 B2 | 2/2008 | Strack et al. | |
| 7,340,347 B2 | 3/2008 | Shray et al. | |
| 7,367,411 B2 | 5/2008 | Leuchtenberg | |
| 7,467,044 B2 | 12/2008 | Tran et al. | |
| 7,478,024 B2 | 1/2009 | Gurpinar et al. | |
| 7,657,494 B2 | 2/2010 | Wilkinson et al. | |
| 7,672,825 B2 | 3/2010 | Brouwer et al. | |
| 7,716,029 B2 | 5/2010 | Couet et al. | |
| 7,725,302 B2 | 5/2010 | Ayan et al. | |
| 7,752,022 B2 | 7/2010 | Fornel et al. | |
| 7,876,705 B2 | 1/2011 | Gurpinar et al. | |
| 7,878,268 B2 | 2/2011 | Chapman et al. | |
| 7,899,657 B2 | 3/2011 | Martin | |
| 7,913,190 B2 | 3/2011 | Grimaud et al. | |
| 7,953,585 B2 | 5/2011 | Gurpinar et al. | |
| 7,953,587 B2 | 5/2011 | Bratton et al. | |
| 7,970,545 B2 | 6/2011 | Sanstrom | |
| 8,145,464 B2 | 3/2012 | Arnegaard et al. | |
| 8,280,635 B2 | 10/2012 | Ella et al. | |
| 8,396,699 B2 | 3/2013 | Maliassov | |
| 8,429,671 B2 | 4/2013 | Wood et al. | |
| 8,718,993 B2 * | 5/2014 | Klie | 703/10 |
| 2001/0042642 A1 | 11/2001 | King | |
| 2002/0013687 A1 * | 1/2002 | Ortoleva | 703/10 |
| 2002/0032550 A1 * | 3/2002 | Ward et al. | 703/2 |
| 2002/0049575 A1 | 4/2002 | Jalali et al. | |
| 2002/0067373 A1 | 6/2002 | Roe et al. | |
| 2004/0193960 A1 | 9/2004 | Vassilev | |
| 2005/0015231 A1 * | 1/2005 | Edwards et al. | 703/10 |
| 2005/0199391 A1 | 9/2005 | Cudmore et al. | |
| 2006/0025976 A1 * | 2/2006 | Kennon et al. | 703/10 |
| 2006/0085174 A1 | 4/2006 | Hemathkumar et al. | |
| 2006/0092766 A1 | 5/2006 | Shelley et al. | |
| 2006/0235667 A1 * | 10/2006 | Fung et al. | 703/10 |
| 2007/0027666 A1 | 2/2007 | Frankel | |
| 2007/0156340 A1 | 7/2007 | Shray et al. | |
| 2007/0156377 A1 | 7/2007 | Gurpinar et al. | |
| 2007/0199721 A1 | 8/2007 | Givens et al. | |
| 2007/0213935 A1 | 9/2007 | Fagnou et al. | |
| 2007/0277115 A1 | 11/2007 | Glinsky et al. | |
| 2007/0279429 A1 | 12/2007 | Ganzer | |
| 2008/0120076 A1 | 5/2008 | Thambynayagam et al. | |
| 2008/0133550 A1 | 6/2008 | Orangi et al. | |
| 2008/0247646 A1 * | 10/2008 | Chefd'hotel | G06T 7/0081 382/173 |
| 2008/0306803 A1 | 12/2008 | Vaal et al. | |
| 2009/0070086 A1 | 3/2009 | Le Ravalec et al. | |
| 2009/0157367 A1 | 6/2009 | Meyer et al. | |
| 2009/0157590 A1 | 6/2009 | Mijares et al. | |
| 2009/0182541 A1 | 7/2009 | Crick et al. | |
| 2009/0248374 A1 * | 10/2009 | Huang et al. | 703/2 |
| 2009/0319243 A1 | 12/2009 | Suarez-Rivera et al. | |
| 2010/0013831 A1 | 1/2010 | Gilje et al. | |
| 2010/0082724 A1 | 4/2010 | Diyankov et al. | |
| 2010/0094605 A1 * | 4/2010 | Hajibeygi et al. | 703/2 |
| 2010/0132450 A1 | 6/2010 | Pomerantz et al. | |
| 2010/0161292 A1 | 6/2010 | Shook et al. | |
| 2010/0161300 A1 | 6/2010 | Yeten et al. | |
| 2010/0174489 A1 | 7/2010 | Bryant et al. | |
| 2010/0217574 A1 | 8/2010 | Usadi et al. | |
| 2010/0223039 A1 | 9/2010 | Maliassov | |
| 2010/0299125 A1 | 11/2010 | Ding et al. | |
| 2011/0022435 A1 | 1/2011 | Reid et al. | |
| 2011/0040533 A1 | 2/2011 | Torrens et al. | |
| 2011/0040536 A1 * | 2/2011 | Levitan | 703/2 |
| 2011/0060572 A1 | 3/2011 | Brown et al. | |
| 2011/0161133 A1 | 6/2011 | Staveley et al. | |
| 2011/0168391 A1 | 7/2011 | Saleri et al. | |
| 2012/0221302 A1 | 8/2012 | Lewandowski et al. | |
| 2012/0271609 A1 | 10/2012 | Laake et al. | |
| 2013/0090907 A1 | 4/2013 | Maliassov | |
| 2013/0116993 A1 | 5/2013 | Maliassov | |
| 2014/0236558 A1 | 8/2014 | Maliassov | |

FOREIGN PATENT DOCUMENTS

| | | |
|---|---|---|
| WO | WO 2007/022289 | 2/2007 |
| WO | WO 2007/149766 | 12/2007 |
| WO | WO 2009/075945 | 6/2009 |
| WO | WO 2009075945 A1 * | 6/2009 |
| WO | WO 2010/134807 | 11/2010 |
| WO | PCT/US2012/023296 | 1/2012 |
| WO | WO 2012/003007 | 1/2012 |
| WO | WO 2012/015500 | 2/2012 |

OTHER PUBLICATIONS

Zhang, K.; et al, "Parallel Computing Techniques for Large-Scale Reservoir Simulation of Multi-Component and Multiphase Fluid Flow," SPE Reservoir Simulation Symposium, Feb. 11-14, 2001, 12 pages.*
Suttleworth, R.; Maliassov, S., "Partitioners for Parallelizing Reservoir Simulations," SPE Reservoir Simulation Symposium, Feb. 2-4, 2009, 8 pages.*
J. Dawson, et al., "Pro Mapping in Biz Talk Server 2009," A Press, Mar. 15, 2009, pp. 145-146.*
M. Hirsch, et al., ". . . Monotone Maps: A Review," Journal of Difference Equations and Applications, Apr. 2005, pp. 379-398.*
Bouhmala, N. et al. (1996), "Partitioning of Unstructured Meshes for Parallel Processing", Supercomputing Review, EPFL-SCR No. 8, 6 pgs.
Hendrickson, B. et al. (1995), "The Chaco User's Guide: Version 2.0", Sandia Tech Report SAND94-2692.
Hendrickson, B. et al. (1995), "An Improved Spectral Graph Partitioning Algorithm for Mapping Parallel Computations", SIAM Journal on Scientific and Statistical Computing, 16, pp. 452-469.
Hendrickson, B. et al. (2000), "Graph Partitioning Models for Parallel Computing", Parallel Computing, 26, pp. 1519-1534.

(56) References Cited

OTHER PUBLICATIONS

Karypis, G. et al. (1999), "A fast and high quality multilevel scheme for partitioning irregular graphs", SIAM Journal on Scientific Computing, 20, pp. 359-392.
Teresco, J.D. et al. (2006), "Partitioning and Dynamic Load Balancing for the Numerical Solution of Partial Differential Equations", Numerical Solution of Partial Differential Equations on Parallel Computers, Chpt. 2, Springer, New York, pp. 55-88.
Walshaw, C. et al. (1998), "Parallel Unstructured Mesh Partitioning", $9^{th}$ Int'l. Conf. on Domain Decomposition Methods, pp. 647-654.
Steensland, J. (2008) "Partitioning of Structured Adaptive Grid Hierarchies", Sandia National Laboratories, 4 pages, retrieved at <<http://hpcn-www.ca.sandia.gov/~jsteens/LBWork.html>> on Dec. 29, 2008.

* cited by examiner

100

300

METHOD AND SYSTEM FOR PARTITIONING PARALLEL SIMULATION MODELS

CROSS-REFERENCE TO RELATED APPLICATION

This application is the National Stage entry under 35 U.S.C. 371 of PCT/US2010/053141 that published as WO 2011/100002 and was filed on 19 Oct. 2010 which claims the benefit of U.S. Provisional Application No. 61/304,056, filed on 12 Feb. 2010, each of which is incorporated by reference, in its entirety, for all purposes.

FIELD

Exemplary embodiments of the present techniques relate to a method and system for partitioning parallel simulation models between computer systems.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Modern society is greatly dependant on the use of hydrocarbons for fuels and chemical feedstocks. Hydrocarbons are generally found in subsurface rock formations that can be termed "reservoirs." Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "simulation models" are used to simulate hydrocarbon reservoirs and optimize the production of the hydrocarbons. A simulation model is a type of computational fluid dynamics simulation where a set of partial differential equations (PDE's) which govern multiphase, multi-component fluid flow through porous media and the connected facility network is approximated and solved. This is an iterative, time-stepping process where a particular hydrocarbon production strategy is optimized.

Simulation models discretize the underlying PDEs on a structured (or unstructured) grid, which represents the reservoir rock, wells, and surface facility network. State variables, such as pressure and saturation, are defined at each grid block. The goal of a simulation model is generally to understand the flow patterns of the underlying geology in order to optimize the production of hydrocarbons from a set of wells and surface facilities. During the past five decades, the size and complexity of simulation models have grown proportionally with the increased availability of computing capacity. Complex simulation models often require the use of parallel computing systems and algorithms to provide adequate simulation turnaround time.

Accordingly, a simulation model can be divided into a number of subsections, or subdomains, wherein each subdomain may be assigned or partitioned to a different computing unit, such as a processor in a cluster computing system or a computing core in a multi-core desktop. However, poor partitioning may result in slow convergence to a solution or even in a failure of the model to converge to a solution. For example, if a partition of a simulation model between different computing units crosses a production well, the simulation may fail. Generally, partitioning may be performed by a mathematical analysis of a graph representing the simulation model.

Recently, there have been a number of research articles published on the general subject of graph partitioning, for example, as applied to finite element analysis and other problems. See, for example, J. D. Teresco, K. D. Devine, and J. E. Flaherty, "Partitioning and Dynamic Load Balancing for the Numerical Solution of Partial Differential Equations," Numerical Solution of Partial Differential Equations on Parallel Computers, Chapter 2, 55-88 (Springer, N.Y., 2006); and B. Hendrickson and T. Kolda, "Graph Partitioning Models for Parallel Computing," Parallel Computing, 26, 1519-1534 (2000). Some of the partitioning techniques have been implemented in software, such as the METIS program. See G. Karypis and V. Kumar, "A fast and high quality multilevel scheme for partitioning irregular graphs," SIAM Journal on Scientific Computing, 20, 359-392 (1999). Another example is the Chaco program, developed at Sandia National Laboratory. See B. Hendrickson and R. Leland, "An Improved Spectral Graph Partitioning Algorithm for Mapping Parallel Computations," SIAM Journal on Scientific and Statistical Computing, 16, 452-469 (1995); see also B. Hendrickson and R. Leland, "The Chaco User's Guide: Version 2.0," Sandia Tech Report SAND94-2692 (1994).

The graph partitioning algorithms are organized into two main classes: global and multi-level. The global algorithms take as input a global graph, or map of the simulation, and perform a spectral technique (such as an eigenvalue decomposition of a Laplacian representation of the global graph) to generate the partitions. These algorithms produce good quality partitions, but are computationally expensive for large problems. Both Chaco and METIS have global algorithms implemented in each software package.

In contrast, multi-level algorithms take the global graph as an input, but create a sequence of coarser, or less detailed, graphs until a certain threshold is reached. The coarsest graph is partitioned using a local optimization technique, such as a spectral technique. The partition on the coarsest level is projected back to finer levels, thus creating a partition for the entire grid. For large graphs, multi-level techniques are preferable due to faster computational time than the global techniques.

Software packages that implement partitioning algorithms generally allow the user to assign a weight to the connection associated with each graph node. For most algorithms, the weights are positive integers. The integer values of the weights should have a relatively short range, such as from about 1 to about 1000 or about 10,000. As the range increases, the robustness of a partitioning algorithm and the quality of a created partition deteriorates. Moreover, the published algorithms and software do not include methods for keeping certain grid blocks or physical properties of a model together in one subdomain. In other words, when using publicly available software, such as METIS or Chaco it is impossible to ensure that certain graph connections are preserved resulting in the corresponding nodes being partitioned into separate subdomains by the partitioning algorithm.

There are approaches to assign the real weight values to edges and nodes of the graph to improve the quality of the partition. Some of them, pertinent to problems in the oil and gas industry are described in International Patent Publication No. WO2009/075945. The patent describes how to construct real weights for nodes and/or connections based on physical information (for example, transmissibility, flux values, etc). Unfortunately, there is not a robust algorithm to map real weights with a very large range to a short range of integer values, in order to produce a robust partition for simulation models.

SUMMARY

An exemplary embodiment of the present techniques provides a method for partitioning a reservoir, for example, to distribute the workload of a simulation model among processors in a computing cluster. The method may include generating a representation of a topology graph of a simulation model in a tangible, computer readable medium, wherein the topology graph comprises a plurality of elements and a plurality of connections between adjacent elements. Each of the plurality of connections may be weighted to create a plurality of weights and each of the plurality of weights may be scaled. The topology graph may be partitioned into two or more subdomains, wherein a partition boundary follows a local topographical minimum in the topology graph. A subdomain may be assigned to each of a plurality of processors.

In some embodiments, the plurality of elements may include computational cells in a computational mesh. The plurality of elements may include rows in a linear system matrix and the plurality of connections correspond to non-zero elements of the matrix.

In some embodiments, the weighting of each of the plurality of connections may be based, at least in part, on physical properties assigned to the computational cells. The physical properties may include transmissibility, total mobility, mass flow, heat flow, or any combinations thereof. The weighting of each of the plurality of connections may be based at least in part on a plurality of off-diagonal coefficients in a Jacobian matrix representing a simulation model. The weighting of each of the plurality of connections may be based, at least in part, upon its proximity to a well bore. A near-well region may be kept in one of the two or more subdomains. The weighting of each of the plurality of connections may be based, at least in part, upon its belonging to a grid block that is perforated by a well bore. Further, the weighting of each of the plurality of connections may be based, at least in part, upon a solution to a local flow problem.

In some embodiments, scaling each of the plurality of weights may be performed using a probability distribution. Further, scaling each of the plurality of weights may be performed by scaling discrete reservoir properties to create a linear mapping. In exemplary embodiments, the simulation model may be performed for a subdomain assigned to each of the plurality of processors.

Another exemplary embodiment provides a system for modeling reservoir properties. The system may include a plurality of processors and a storage medium comprising a representation of a topology graph of a reservoir model, wherein the topology graph comprises a plurality of connections. The system may also include a machine readable medium comprising code configured to direct at least one of the plurality of processors to weight each of the plurality of connections to create a plurality of weights, map each of the plurality of weights to an integer value, partition the topology graph into two or more subdomains, and assign each of the two or more subdomains to one of the plurality of processors.

In some embodiments, each of the plurality of weights may be based, at least in part, on an associated physical property. The physical property may represents heat transfer, mass transfer, total flow, transmissibility, or any combinations thereof. The plurality of processors may include a cluster computing system.

Another exemplary embodiment provides a tangible, computer readable medium that includes code configured to direct a processor to create a topology graph of a simulation model, wherein the topology graph comprises a plurality of connections between the center points of adjacent computational cells in a computational mesh. The code may also be configured to weight each of the plurality of connections to create a plurality of weights and scale each of the plurality of weights. the code may further be configured to partition the topology graph into two or more subdomains, wherein a partition boundary follows a local topographical minimum in the topology graph. The code may be configured to assign each of the subdomains to one of a plurality of processors.

In some embodiments, the code may be configured to direct the one of the plurality of processors to process a simulation model for the subdomain. Further, the code may be configured to direct the processor to map the plurality of weights into an integer range.

DESCRIPTION OF THE DRAWINGS

The advantages of the present techniques are better understood by referring to the following detailed description and the attached drawings, in which.

DETAILED DESCRIPTION

Figure 1:
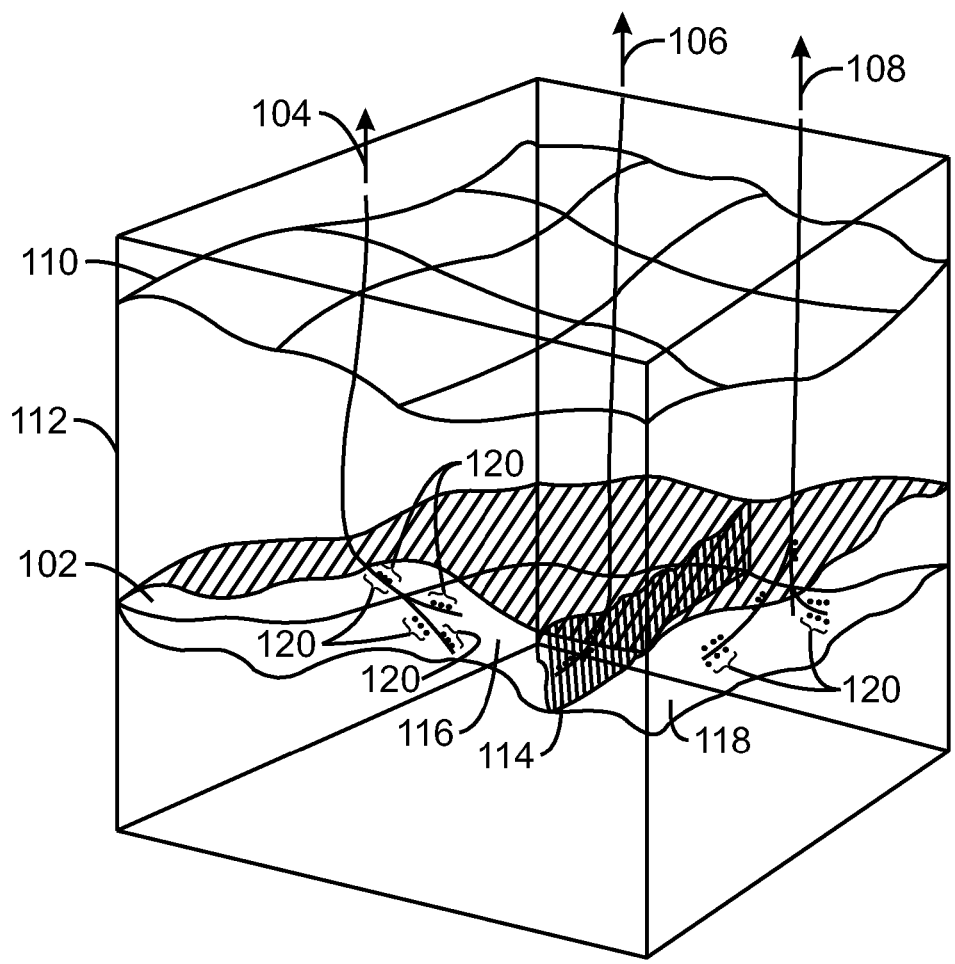
FIG. 1 is a schematic view of a reservoir, in accordance with an exemplary embodiment of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Coarsening" refers to reducing the number of cells in simulation models by making the cells larger, for example, representing a larger space in a reservoir. Coarsening is often used to lower the computational costs by decreasing the number of cells in a geologic model prior to generating or running simulation models.

"Computer-readable medium" or "tangible, computer-readable medium" as used herein refers to any tangible storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like.

As used herein, "to display" or "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (for example, a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (for example, electronically or physically via a data storage device or hard copy) and/or otherwise made available (for example, via a network) in order to facilitate the subject using a printer to print a hard copy form of reference image. In such an example, the printer may be a printer which has been calibrated through the use of any conventional software intended to be used in evaluating, correcting, and/or improving printing results (for example, a color printer that has been adjusted using color correction software).

"Exemplary" is used exclusively herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water and gas), energy, and momentum through a physical system using a computer. The physical system includes a three dimensional reservoir model, fluid properties, the number and locations of wells. Flow simulations also require a strategy (often called a well-management strategy) for controlling injection and production rates. These strategies are typically used to maintain reservoir pressure by replacing produced fluids with injected fluids (for example, water and/or gas). When a flow simulation correctly recreates a past reservoir performance, it is said to be "history matched," and a higher degree of confidence is placed in its ability to predict the future fluid behavior in the reservoir.

"Permeability" is the capacity of a rock to transmit fluids through the interconnected pore spaces of the rock. Permeability may be measured using Darcy's Law: $Q=(k\ \Delta P\ A)/(\mu L)$, wherein Q=flow rate ($cm^3/s$), $\Delta P$=pressure drop (atm) across a cylinder having a length L (cm) and a cross-sectional area A ($cm^2$), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. An impermeable layer generally has a permeability of less than about 0.1 millidarcy.

"Monotone mapping" is a function or relation between two sets of real numbers that preserves order. This mapping is a relation between an input real number (or integer) to an output real number (or integer) so that the relation is consistently increasing or decreasing.

"Pore volume" or "porosity" is defined as the ratio of the volume of pore space to the total bulk volume of the material expressed in percent. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

"Reservoir" or "reservoir formations" are typically pay zones (for example, hydrocarbon producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Simulation model" refers to a specific mathematical representation of a real hydrocarbon reservoir, which may be considered to be a particular type of geologic model. Simulation models are used to conduct numerical experiments (reservoir simulations) regarding future performance of the field with the goal of determining the most profitable operating strategy. An engineer managing a hydrocarbon reservoir may create many different simulation models, possibly with varying degrees of complexity, in order to quantify the past performance of the reservoir and predict its future performance.

"Transmissibility" refers to the volumetric flow rate between two points at unit viscosity for a given pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for understanding connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, the casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

Overview

Exemplary embodiments of the present techniques disclose methods and systems for partitioning simulation models among computing units, such as individual computer systems, computing units in a computer cluster, and the like. The techniques are designed to minimize the chance of placing a partition separating two computational subdomains through a near well region or geologic feature (such as faults). In an exemplary embodiment, the techniques map real valued connection weights onto a narrow range of integer weights for use in partitioning algorithms, such as the publically available METIS or Chaco algorithms.

FIG. 1 is a schematic view 100 of a reservoir 102, in accordance with an exemplary embodiment of the present techniques. The reservoir 102, such as an oil or natural gas reservoir, can be a subsurface formation that may be accessed by drilling wells 104, 106, and 108 from the surface 110 through layers of overburden 112. The reservoir 102 may have one or more faults 114 dividing areas, for example regions 116 and 118, and which may either restrict or enhance the flow of hydrocarbons. The wells 104, 106, and 108 may be deviated, such as being directionally drilled to follow the reservoir 102. Further, the wells can be branched to increase the amount of hydrocarbon that may be drained from the reservoir, as shown for wells 104 and 108. The wells 104, 106, and 108, can have numerous areas with perforations 120 (indicated as dots next to the wells) to allow hydrocarbons to flow from the reservoir 102 into the wells 104, 106, and 108 for removal to the surface.

A simulation model, or simulator, of the reservoir 102 is likely to find that the greatest changes occur in the vicinity of the wells 104, 106, and 108, and other reservoir features, such as the fault 114. Accordingly, it would be useful to keep areas in the vicinity of each of these features in single computational subdomains. A partition between computational subdomains that crosses a well 104, 106, and 108, fault 114, or other feature may slow convergence of the simulation, increase computational loading by increasing communication between computing units, or even prevent convergence, resulting in a failure to find a solution.

Figure 2:
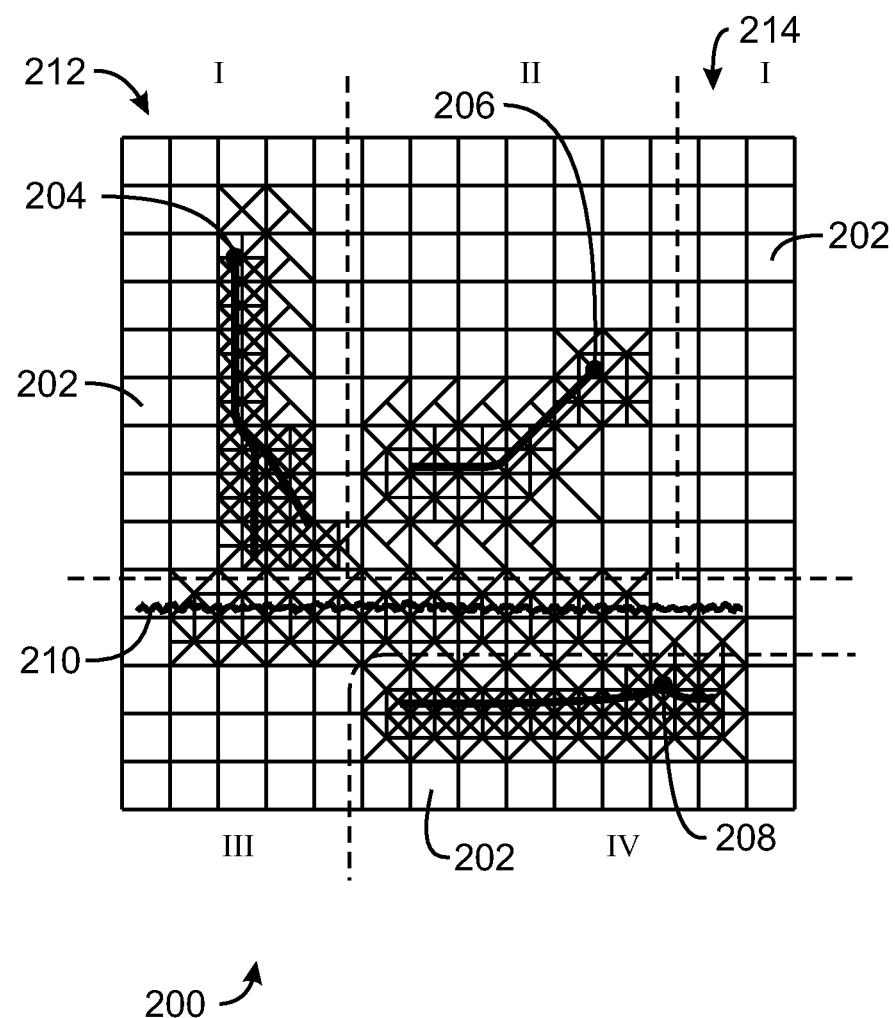
FIG. 2 is a top view of a reservoir showing a planar projection of a computational mesh over the reservoir, in accordance with an exemplary embodiment of the present techniques.

FIG. 2 is a top view of a reservoir showing a planar projection of a computational mesh 200 over the reservoir, in accordance with an exemplary embodiment of the present techniques. Although the computational mesh 200 is shown as a two dimensional grid of computational cells (or blocks) 202 to simplify the explanation of the problem, it should be understood that the actual computational mesh 200 can be a three dimension matrix of computational cells 202 that encompasses the reservoir. A computational cell 202 is a single two or three dimensional location within a simulation model that represents a physical location in a reservoir. The computational cell 202 may have associated properties, such as a porosity or an oil content, which is assumed to be a single value over the entire computational cell 202 and is assigned to the center of the computational cell 202. Computational cells 202 may interact with adjacent computational cells 202, for example, by having flux properties assigned to a shared border with the adjacent computational cells 202. For example, the flux properties may include heat or mass transfer values.

The computational mesh 200 can be coarsened in areas that may have less significant changes, for example, by combining computational cells 202 that are not in proximity to a well or other reservoir feature. Similarly, the computational mesh 200 may retain a fine mesh structure in the vicinity of wells or other reservoir features, such as the first well 204, or other reservoir features, for example, a second well 206, a third well 208, a fault 210, or any other features that may show larger changes than other areas.

The computational mesh 200 represents the simulation model, and can be divided among computing units to decrease the amount of time needed to provide a result for the simulation. This procedure may be termed "parallelization." The parallelization of the simulation model is realized by parallelizing the individual components at each time step. To achieve efficient utilization of the parallel computing units the simulation model can be distributed across the computing units so that the computational load is evenly balanced and the amount of inter-unit communication is minimized. This division is performed by partitioning the simulation model, i.e., assigning different computational cells 202 in the computational mesh 200 to different computing units (such as described with respect to FIG. 9). Each computational cell 202 may require a different approach to parallelization based on the numerical formulation, the actual input data, the computational task, and user supplied options.

In the exemplary embodiment shown in FIG. 2, the computational mesh 200 is partitioned between four computing units, as indicated by the subdomains labeled I-IV. Although four computing units are used in FIG. 2, any number of computing units may be used in other embodiments, depending on the size of the simulation model and the number of near well features. For example, a small simulation model may provide results in a reasonable timeframe from a single computing device, while a large simulation may use 10, 100, 1000, or even more computing units for the parallelization.

Further, while the subdomains I-IV do not cross near well regions or significant reservoir features, the subdomains are not limited to contiguous areas, but may include non-contiguous areas, which may be useful for balancing the load between the computing units. For example, as illustrated in FIG. 2, subdomain I may be divided into two regions. A first region 212 encompasses the near well region for the first well 204, while a second region 214 encompasses a number of larger computational cells 202 that may have less significant changes than the near well regions.

Figure 3:
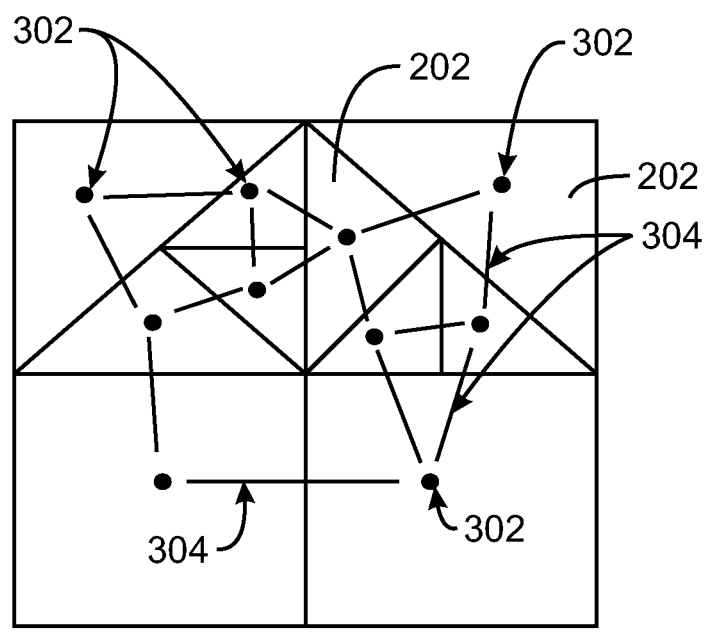
FIG. 3 is a close up view of the computational mesh, illustrating connections between computational cells, in accordance with an exemplary embodiment of the present techniques.

FIG. 3 is a close up view of the computational mesh 200, illustrating connections between computational cells 202, in accordance with an exemplary embodiment of the present techniques. As shown in FIG. 3, each computational cell 202, has a center point 302, which may have associated static properties, such as oil content, permeability, and pressure, among others. A connection 304 can be defined between the center point 302 of each computational cell 202. The connections 302 may also have associated flux properties, such as mass flow or heat flow.

The connections 304 form a topology graph of the grid connectivity which may be used for partitioning the computational mesh 200. Further, the weighting of the connections 304 may be used to determine whether a partitioning algorithm will be allowed to cut through the connection 304 and send computational cells 202 on one side to a first computing unit and computational cells on the other side to a second computing unit.

Figure 4:
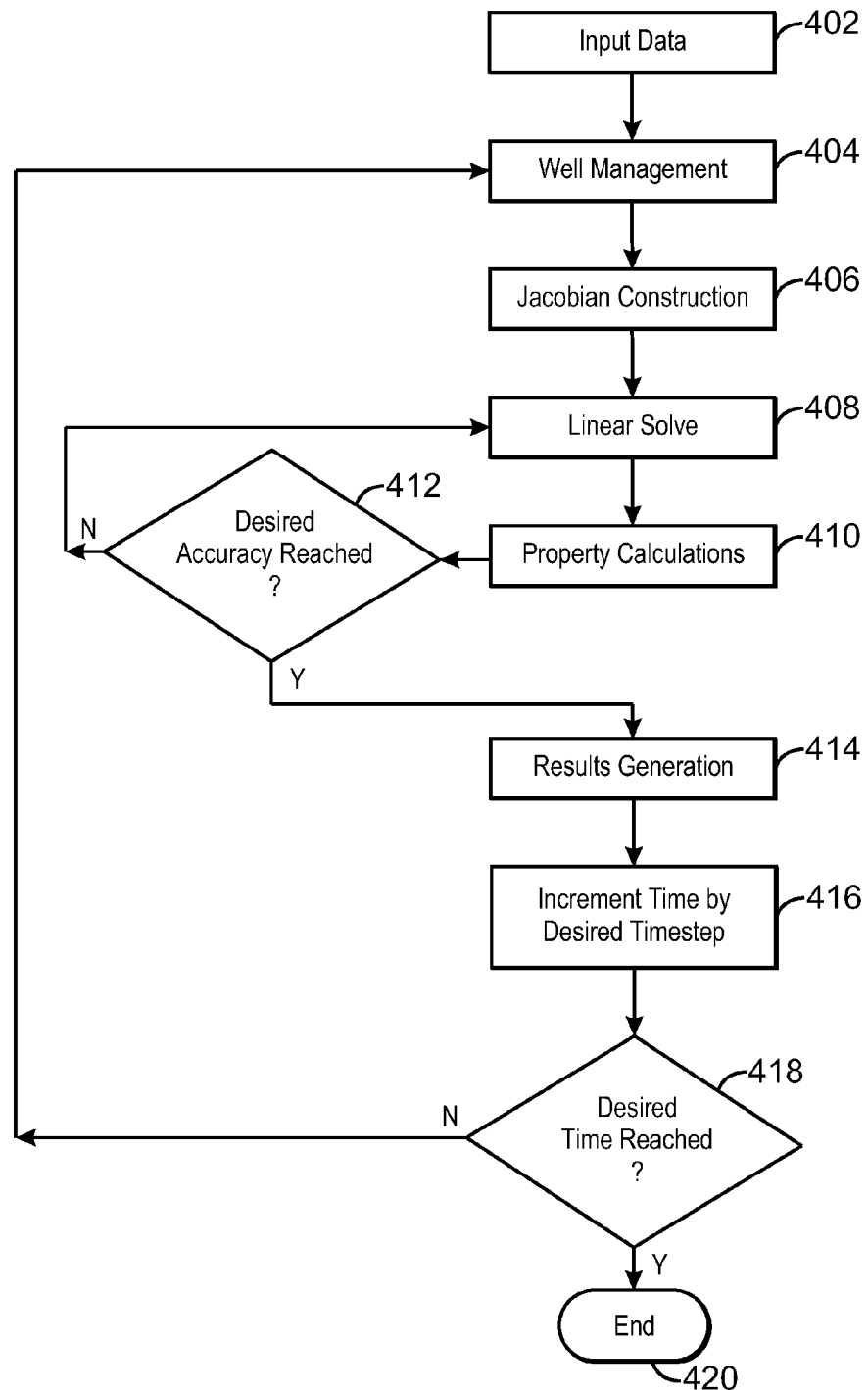
FIG. 4 is a process flow diagram of a workflow for modelling a reservoir, in accordance with an exemplary embodiment of the present techniques.

The simulation model and the partitioning procedure may be more clearly understood by examining a simulation workflow, as discussed with respect to FIG. 4. Exemplary embodiments of the present techniques showing the partitioning of a simulation model are discussed further with respect to FIGS. 5 and 6. A method for weighting a connection 304 that may be used in exemplary embodiments is discussed with respect to FIGS. 7 and 8. A computing device that may be used in exemplary embodiments of the present techniques is discussed with respect to FIG. 9.

Workflow for Modelling a Reservoir

FIG. 4 is a process flow diagram of a workflow 400 for modelling a reservoir, in accordance with an exemplary embodiment of the present techniques. Although the discretization (coarsening) and the level of implicitness (which state variables, such as pressure or saturation, are treated implicitly or explicitly in the formulation) of the solution process varies, simulation models may perform in a similar fashion as workflow 400. A simulation model can begin at block 402 by parsing user input data. The input data may include the problem formulation, a geologic model that is discretized into grid blocks with physical properties defined at each grid block, including rock properties (such as permeability) and fluid properties (such as transmissibility). At block 404, a well management routine computes the current state of surface facilities and wells from the governing equations. At block 406, the values from the well management routine are used along with the value of state variables at each computational cell to construct a Jacobian matrix. The Jacobian matrix is the matrix (or array) of all first order partial derivatives (with respect to the state variables) of a vector valued function. In reservoir simulation, the Jacobian details the change of the governing partial differential equations with respect to the state variables (pressure, saturation).

At block 408, the linear solver uses the Jacobian matrix to generate updates for physical properties of interest, such as pressure and saturation, among others. At block 410, the calculated physical properties are compared to either previously calculated properties or to measured properties, and, at block 412, a determination is made as to whether a desired accuracy has been reached. In an exemplary embodiment, the determination is made by determining that the calculated properties have not significantly changed since the last iteration (which may indicate convergence). For example, convergence may be indicated if the currently calculated properties are within 0.01%, 0.1%, 1%, 10%, or more of the previously calculated properties. In other embodiments, the determination may be determining if the calculated properties are sufficiently close to measured properties, for example, within 0.01%, 0.1%, 1%, 10%, or more. If the desired accuracy is not reached, process flow returns to block 408 to perform another iteration of the linear solver.

If at block 412, the desired accuracy has been reached, process flow proceeds to block 414, at which results are generated. The results may be stored in a data structure on a tangible, machine readable medium, such as a database, for later presentation, or the results may be immediately displayed or printed after generation. At block 416, the time is incremented by a desired time step, for example, a day, a week, a month, a year, 5 years, 10 years or more, depending, at least in part, on the desired length of time for the simulation. At block 418, the new time is compared to the length desired for the simulation. If the simulation has reached the desired length of time, the simulation ends at block 420. If the time has not reached the desired length, flow returns to block 404 to continue with the next increment.

The parallelization of the processes may be considered to fall into two main types, task based parallelization and grid based parallelization. For task based parallelization, a calculation is divided into sub tasks that are run independently in parallel. For example, in the well management task at block 404, a set of operations may be computed on each of a set of wells that can be performed independently of one another. Therefore each computing unit may execute the operations independently of the other computing units unit.

Grid based parallelization may be performed at a number of points in the processes, such as in the Jacobian construction and/or the property calculations discussed with respect to blocks 406 and 410. In the computational process of constructing the Jacobian, rock and fluid properties with corresponding derivatives are calculated at each computational cell. This type of parallelization is used for computations that do not depend on the computational cells being adjacent or require global communication for the computations.

Vapor-liquid equilibrium (VLE) fluid property computations may be considered in an example of parallelization. If a simulation model uses a black oil fluid characterization for VLE computations, the amount of computational work required for a flash calculation is roughly proportional to the number of computational cells due to the linear nature of the black oil VLE computations. However, if a compositional fluid model is chosen, the amount of computational work for the flash calculation within a single computational cell depends on the cell's position in the phase state space. Hence, the amount of computational work may vary sharply from cell to cell.

Grid based parallelization may also be used to divide the problems used by the linear solver among computing units. The linear solver is an algorithm used to compute updates to state properties (pressure, saturation, etc). A linear solver requires local computations that are similar between subdomains, in other words the computational cells associated with each computing unit. However, linear solvers also require global computations (which are not required for Jacobian construction) to compute updates to the state variables of interest.

Partitioning a simulation model generally has three goals: load balancing, communication minimization, and algebraic compatibility. A good load balance evenly distributes the computational work from one computing unit to another. Further, a good partitioning minimizes the interfacing used between partitions, thus minimizing the communication costs required by the algorithm using the partition. A good partitioning also asserts algebraic compatibility, allowing fast convergence of the linear solver. Efficient partitioning may decrease processing time at all stages of a simulation model, but is especially useful for the efficiency of a parallel linear solver.

As previously noted, one of the factors that can influence the efficiency of a parallel linear solver is assigning computational cells representing a well bore (and near well bore region) to a single computing unit. Therefore, the boundaries of the subdomains should not partition the well connections otherwise the convergence of a linear solver may dramatically degrade.

Partitioning can be based on a topological graph of the matrix connectivity. In an exemplary embodiment, the topological graph is generated from a connectivity diagram of the computational mesh wherein the center of each computational cell represents a node, and a graph edge connect each node (or center point). For the computational mesh, as discussed with respect to FIG. 3, the nodes of the graph corresponding to adjacent computational cells are connected by graph edges.

In another exemplary embodiment, the topological map is generated from a connectivity diagram of the matrix representation of the linear system. For the matrix, the diagonal elements of the matrix represent the nodes of the graph and the non-zero off-diagonal matrix elements denote a connection between corresponding nodes. In addition to the connectivity diagram, partitioning algorithms may consider the weights assigned to edges of the graph (connections). Typically, a larger connection weight implies a smaller chance that particular connection will be cut and the nodes to which this edge is connected will be partitioned into separate subdomains by the partitioning algorithm.

Partitioning

An exemplary embodiment of the present techniques defines a weighting scheme for the connections in a topology map that are perforated by a wellbore so that a partitioning algorithm (for example, METIS or Chaco) preserves wells, near well nodes, and reservoir cells connected to those wells in a single subdomain. The weighting scheme is not limited to wells, but can also be applied to any reservoir feature that should remain in a single subdomain when partitioning.

Figure 5:
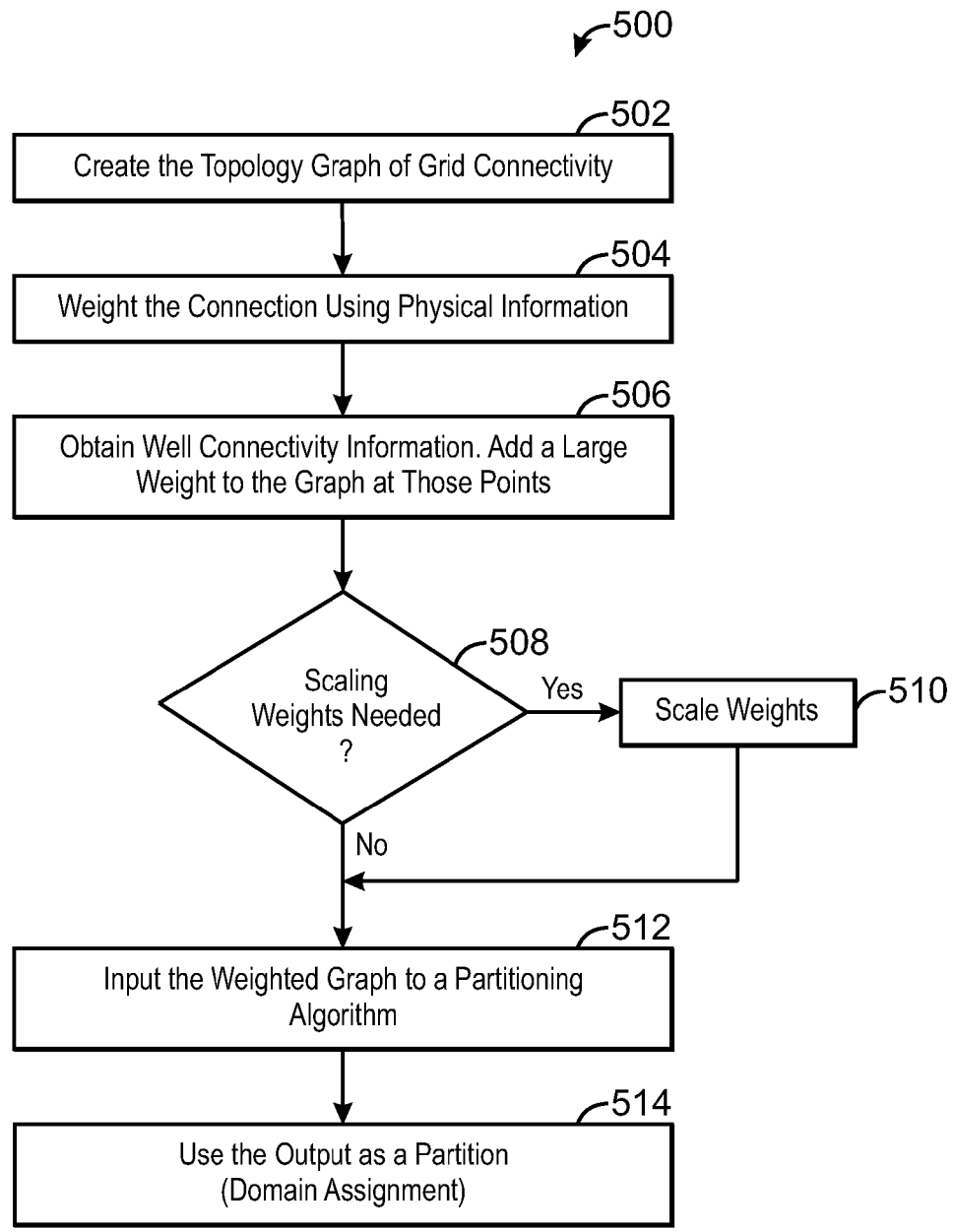
FIG. 5 is a block diagram of a method for partitioning a simulation model, in accordance with an exemplary embodiment of the current techniques.

FIG. 5 is a block diagram of a method 500 for partitioning a simulation model, in accordance with an exemplary embodiment of the current techniques. The method 500 begins at block 502 with the construction of a topology graph of grid connectivity. The topological map may be created from the computational mesh discussed with respect to FIG. 2, for example, by associating a center point with each computational cell and then connecting each center point, as discussed with respect to FIG. 3. The connections between the center points form the topological graph of grid connectivity. At block 504, initial weights for the connections may be created using physical information (such as transmissibility or total velocity, among others) for each connection on the topological graph.

At block 506, a mapping or table of connections between wells and grid connections (or reservoir nodes) can be created. The mapping may be used to create large connection weights for connections that are perforated by the same well or reservoir feature.

If the values used for scaling the weights are very large, non-integer, or both, it may be necessary to scale and map the physical information to integer graph weights, as determined at block 508. The scaling is performed at block 510, and may, for example, use the techniques discussed below with respect to FIGS. 7 and 8. In some embodiments, a threshold cut-off may be applied to the weights. For example, if a connection weight exceeds an upper limit, the weight may be set to the upper limit.

At block 512, a partitioning algorithm may use the weighted graph as an input. The partitioning algorithm divides the computational mesh into subdomains, based on the weighting of the connections. Higher weighted connections are less likely to be divided by partitions into separate subdomains than lower weighted connections. Accordingly, the partitions between subdomains will follow local minima in the topology graph, ensuring that wells and other significant reservoir features are kept in single subdomains. At block 514, the output of the partitioning algorithm is used for the assignment of computational cells to processors for the linear solver (or for assigning other portions of the simulation model).

Figure 6:
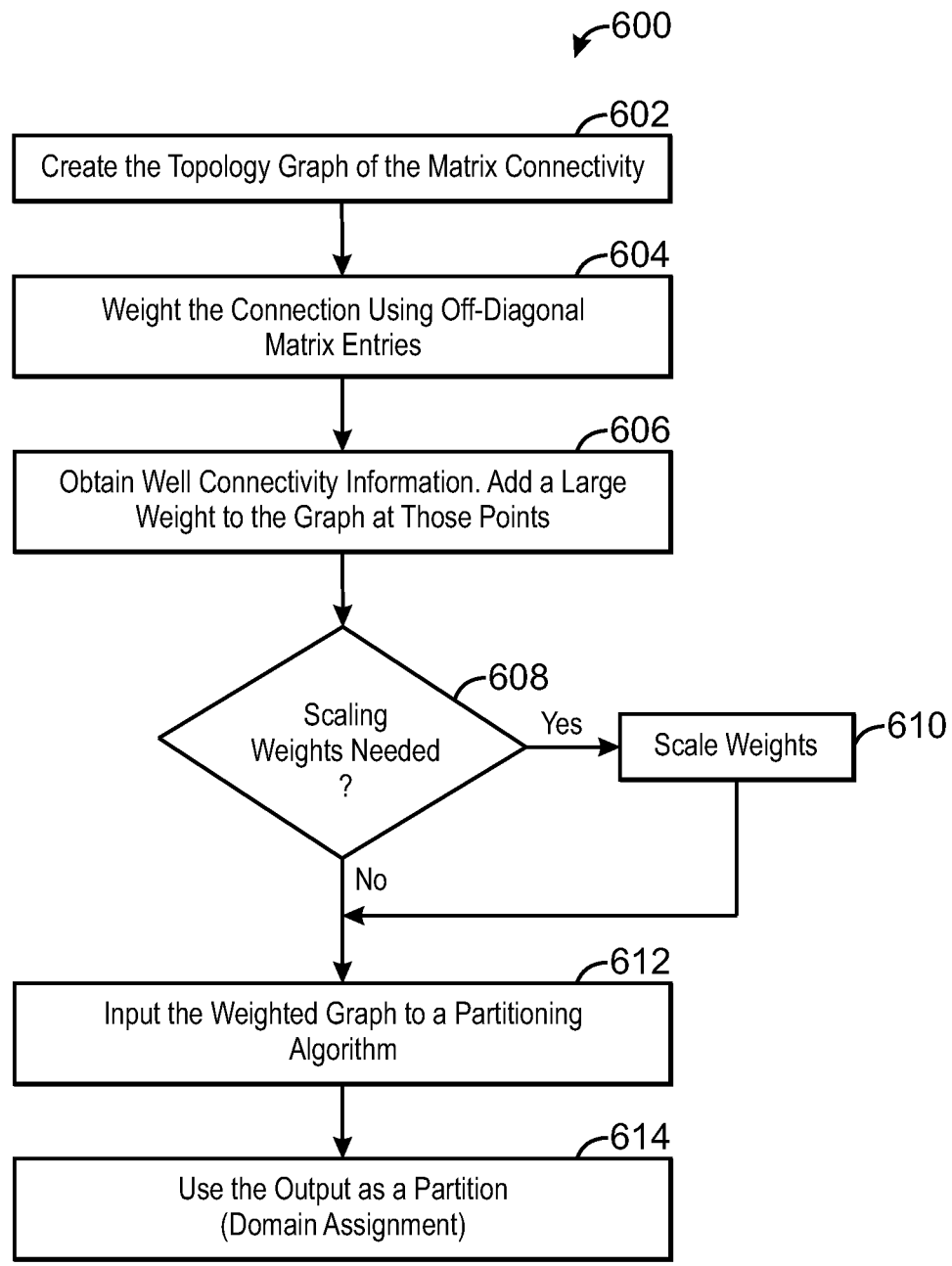
FIG. 6 is a block diagram of a method for partitioning a simulation model, in accordance with an exemplary embodiment of the present techniques.

FIG. 6 is a block diagram of a method 600 for partitioning a simulation model, in accordance with an exemplary embodiment of the present techniques. At block 602, a topology graph is created from the linear system (or Jacobian) matrix that is to be partitioned. A graph is a collection of nodes (or vertices) and a collection of edges (or connections) that connect pairs of nodes. Weights can be assigned to the edges to form a weighted graph. A graph can be created from a linear system matrix by representing each linear system row (or equation) as a node and the connection between nodes as an edge. For example, the connections in the topology graph can be created for off-diagonal entries in a Jacobian matrix representing the well simulation.

At block 604, initial weights for the graph connections may be created using the values of the off-diagonal matrix entries corresponding to each connection on the topological graph. At block 606, a mapping or table of connections between wells and reservoir nodes (i.e., which matrix equation unknowns correspond to the wells and to which reservoir unknowns they are connected) can be created. As for the physical mapping discussed with respect to FIG. 5, this mapping can be used to create larger connection weights between the nodes of the graph corresponding to the connections that are perforated by the same well.

At block 608, a determination is made as to whether scaling is needed, for example, if the connection weights are too large for use by the partitioning algorithm. At block 610, the matrix values are scaled to the integer graph weights, for example, by doubling the matrix values. If necessary, a threshold cut-off is applied to the weights. The scaling is discussed further with respect to FIGS. 7 and 8.

At block 612, a partitioning algorithm may use the weighted graph as an input. The partitioning algorithm divides the computational mesh into subdomains, based on the weighting of the connections. As discussed above, higher weighted connections are less likely to be divided by partitions into separate subdomains than lower weighted connections. At block 614, the subdomains are used as a domain mapping for the assignment of grid blocks to processors for the linear solver.

In an exemplary embodiment, the method discussed with respect to FIGS. 5 and 6 is applied once during a simulation to create a static partition. In other embodiments, the partitioning method can be used to create a dynamic partition by applying the method at different stages of the simulation using changing data (for example, total velocity) to define the weights of the graph or matrix.

Scaling Connection Weights Between Cells

Exemplary embodiments of the present techniques use special values for the weights associated with wells and map those weights into integer values for input into the partitioning algorithms. However, the range of physical values may be extremely large, and, thus, the weights may need to be scaled. For example, if transmissibility coefficients are used for initial weight definition, the range can easily span from $10^{-6}$ to $10^2$ Darcy. Further, partitioning algorithms, such as METIS or Chaco, typically accept weights as positive integer values within a relatively small range, for example, between 1 and 1000. A larger range of integer values can produce a less robust partition. Accordingly, a proper mapping between the large range of physical weights and (relatively) small range of integer weights can be useful. For example, a scaling or mapping scheme can be a monotone, linear mapping that filters out extreme values of the connection weights.

As described below, the weighting of connections may be performed by several techniques. Specifically, the weighting may be performed on the basis of perforations, near well (or feature) regions, and flow calculations, among others. Each of these techniques is described below.

In an exemplary embodiment of the present techniques, a table or list of grid blocks or matrix rows that are perforated by the well bore is created. The grid blocks or matrix rows that appear in this list or table are used for the weighting scheme. For example, the connection weights may have a incremental value added to the physical weighting for each connection that is perforated by a well.

In another exemplary embodiment, a near well procedure may be used. The near well procedure determines which grid blocks or matrix rows are approximate to the well perforations, for example, within two or three adjacent blocks or rows, and includes those grid blocks or matrix rows in the weighting scheme. For example, a first value may be added to the weight for each connection that is perforated by a well, and a second value may be added to the weight for each connection that is adjacent to a connection that is perforated by a well.

Another technique that may be used in exemplary embodiments chooses which grid blocks to include in the weighting scheme by solving a local flow problem to determine how the fluids travel away from the well bore. The results of this flow problem tell which grid blocks or matrix rows should remain in the same subdomain, allowing those grid blocks or matrix rows to have increased weights, for example, by adding a value.

The techniques for scaling the maps are not limited to those discussed above. One of ordinary skill will recognize that any number of other techniques may be used to weight the connections. For example, statistical calculations or artificial intelligence systems (such as neural networks), may be used to determine the weighting for connections near wells and features. All of these techniques follow the method shown in FIG. 7.

Figure 7:
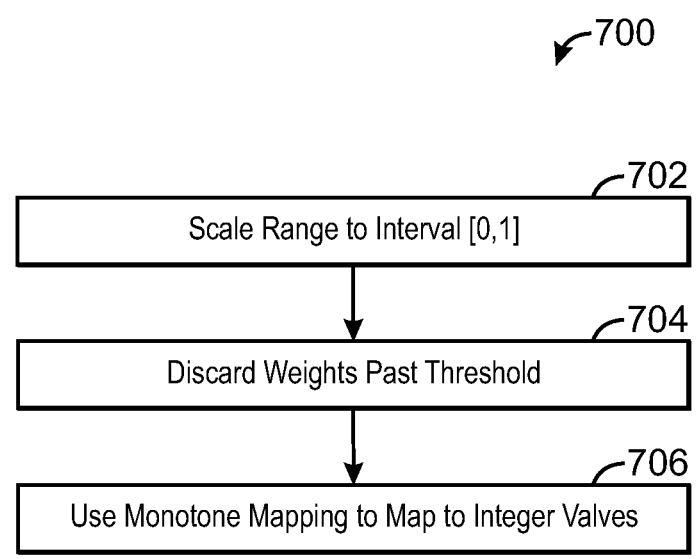
FIG. 7 is a process flow diagram illustrating a method for scaling connection weights, in accordance with an exemplary embodiment of the present techniques.

FIG. 7 is a process flow diagram illustrating a method 700 for scaling connection weights, in accordance with an exemplary embodiment of the present techniques. The method generally corresponds to block 510 or block 610, discussed with respect to FIGS. 5 and 6, respectively. The method 700 begins at block 702 with the scaling of the range of real weight values to the interval [0,1]. This may be performed by a direct linear mapping or by a statistical calculation. For example, if connections in the topology graph are weighted using transmissibility, a cumulative distribution function (or similar probability distribution function) which describes the distribution of the transmissibility value that can be used to scale the transmissibility values into the interval [0,1].

At block 704, scaled weights that are within a defined threshold range of 1 are reset to the bottom of the scaled range. For example, for some small threshold value $\epsilon$, connection weights within the interval [1−$\epsilon$,1] can be reassigned to a weight of 1−$\epsilon$. Typically, a threshold value of $\epsilon$=0.10 or $\epsilon$=0.05 is selected and larger weights are assigned (such as transmissibility values) to the value: 1−$\epsilon$. In an exemplary embodiment, the value for $\epsilon$=0.05

Once we truncate the large values, at block 706, a linear or nonlinear monotone mapping function can be used to map the interval [0, 1−$\epsilon$] to the integer values between 1 and an upper integer value that is consistent with the partitioning algorithm input. The upper integer value may be 100, 500, 1000, 10000, or more. In other words, the graph connection weights $\hat{T}$ can be mapped to integer values W in a predefined range, typically from 1 to N=1000 or 10,000.

Figure 8:
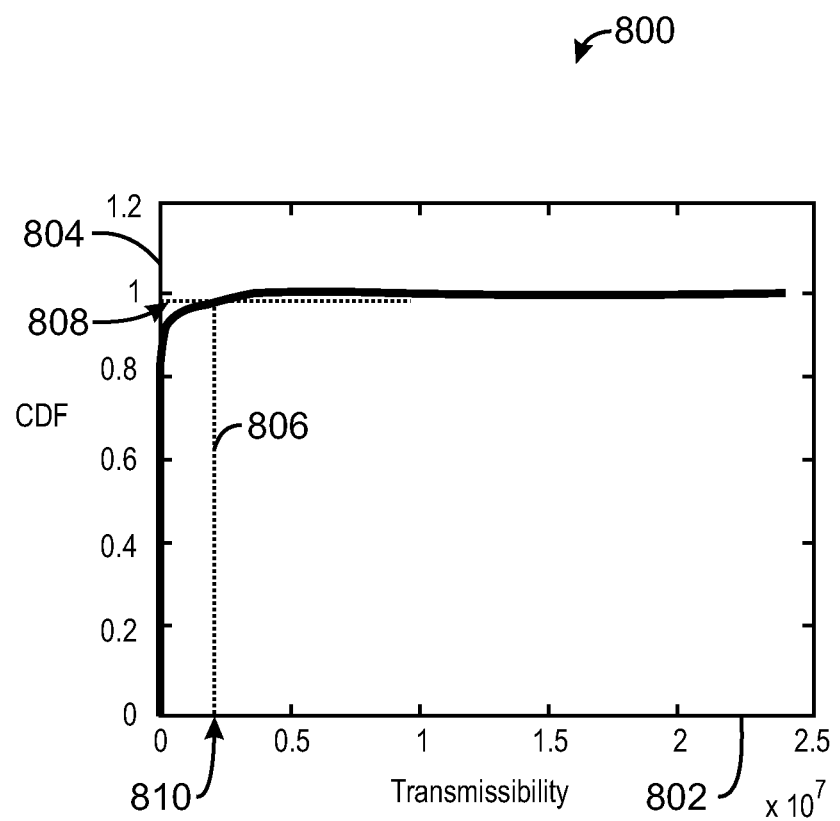
FIG. 8 is a graph illustrating a mapping of real values to integer weights using a cumulative distribution function, in accordance with an exemplary embodiment of the present techniques.

FIG. 8 is a graph 800 illustrating a mapping of real values to integer weights using a cumulative distribution function, in accordance with an exemplary embodiment of the present techniques. In the graph 800, the x-axis 802 represents transmissibility in the reservoir, while the y-axis 804 represents the value of the cumulative distribution function (CDF). The interval [0, 1−$\epsilon$] is indicated by reference number 806. The $CDF_{cutoff}$ 808 is the value 1−$\epsilon$. Thus, any value for T that generates a mapped value for the CDF that is greater than the $CDF_{cutoff}$ 808 is reassigned to the value of T at the $CDF_{cutoff}$ 808. The value of T at the $CDF_{cutoff}$ 808 is termed the $T_{cutoff}$ 810.

Once the values for T are assigned, the integer connection weights W can be calculated by the formulas shown in Eqn. 1.

$$\tilde{T} = \begin{Bmatrix} T, & T < T_{cutoff} \\ T_{cutoff}, & T \geq T_{cutoff} \end{Bmatrix}, W = 1 + (N-1) \cdot \left[ \tilde{T}/T_{cutoff} \right] \quad \text{Eqn. 1}$$

As indicated in Eqn. 1, the non-integer connection weights $\tilde{T}$ for transmissibility may be set to the value of transmissibility, if less than $T_{cutoff}$ 810, and set to $T_{cutoff}$ 810 if equal to or greater than $T_{cutoff}$ 810. After the non-integer connection weights are computed, the integer connection weights, W, may be calculated using the formula shown in Eqn. 1. The procedure for mapping the connection weights to an integer range is not limited to the formula shown in Eqn. 1. In other embodiments, W may be calculated any other monotone (or order preserving) mapping algorithm, such as the formula shown in Eqn. 2.

$$W = 1 + (N-1) \cdot [\ln(\tilde{T}/T_{cutoff})/\ln(2)] \quad \text{Eqn. 2}$$

The combination of scaling with a cut-off threshold and a proper monotone mapping constructs connection weights that allow a partitioning algorithm to partition a reservoir without placing a well or other reservoir feature into different subdomains. The weighting also keeps the nodes and edges corresponding to the large values of the physical property used to assign the original real weights (such as transmissibility or total velocity) in a single subdomain, which may enhance the performance of parallel linear solver.

Exemplary Cluster Computing System

Figure 9:
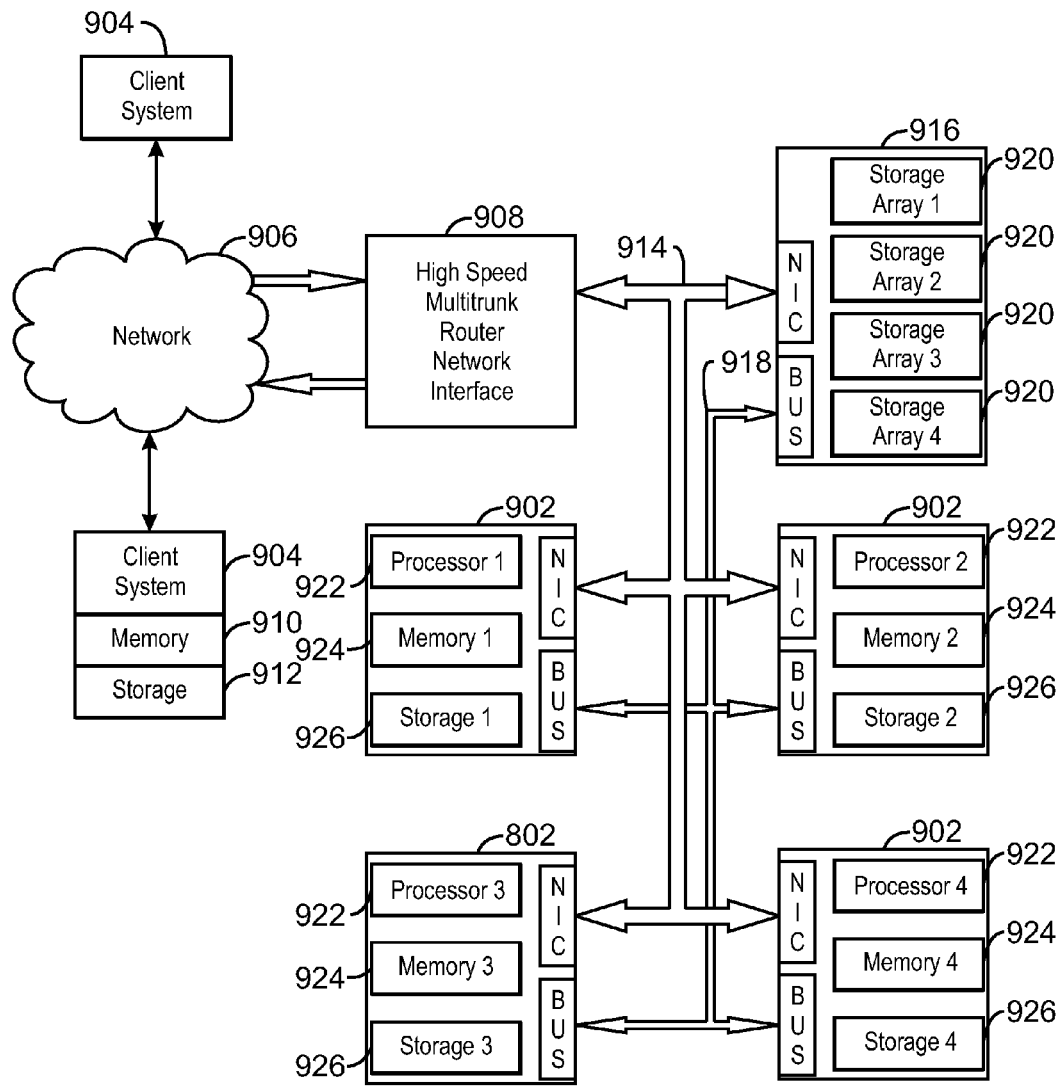
FIG. 9 is a block diagram of an exemplary cluster computing system that may be used in exemplary embodiments of the present techniques.

FIG. 9 is a block diagram of an exemplary cluster computing system 900 that may be used in exemplary embodiments of the present techniques. The cluster computing system 900 illustrated has four computing units 902, each of which may perform calculations for part of the simulation model. However, one of ordinary skill in the art will recognize that the present techniques are not limited to this configuration, as any number of computing configurations may be selected. For example, a small simulation model may be run on a single computing unit 902, such as a workstation, while a large simulation model may be run on a cluster computing system 900 having 10, 100, 1000, or even more computing units 902. In an exemplary embodiment, each of the computing units 902 will run the simulation for a single subdomain. However, allocation of the computing units 902 may be performed in any number of ways. For example, multiple subdomains may be allocated to a single computing unit 902 or multiple computing units 902 may be assigned to a single subdomain, depending on the computational load on each computing unit 902.

The cluster computing system 900 may be accessed from one or more client systems 904 over a network 906, for example, through a high speed network interface 908. Each of the client systems 904 may have tangible, computer readable memory 910 for the storage of operating code and programs, including random access memory (RAM) and read only memory (ROM). The operating code and programs may include the code used to implement all or portions of the methods discussed with respect to FIGS. 4-7. The client systems 904 can also have other tangible, computer readable media, such as storage systems 912. The storage systems 912 may include one or more hard drives, one or more optical drives, one or more flash drives, any combinations of these units, or any other suitable storage device. The storage systems 912 may be used for the storage of code, models, data, and other information used for implementing the methods described herein.

The high speed network interface 908 may be coupled to one or more communications busses in the cluster computing system 900, such as a communications bus 914. The communication bus 914 may be used to communicate instructions and data from the high speed network interface 908 to a cluster storage 916 and to each of the computing units 902 in the cluster computing system 900. The communications bus 914 may also be used for communications among computing units 902 and the storage array 916. In addition to the communications bus 914 a high speed bus 918 can be present to increase the communications rate between the computing units 902 and/or the cluster storage 916.

The cluster storage 916 can have one or more tangible, computer readable media devices, such as storage arrays 920 for the storage of data, visual representations, results, code, or other information, for example, concerning the implementation of and results from the methods of FIGS. 4-7. The storage arrays 920 may include any combinations of hard drives, optical drives, flash drives, holographic storage arrays, or any other suitable devices.

Each of the computing units 902 can have a processor 922 and associated local tangible, computer readable media, such as memory 924 and storage 926. The memory 924 may include ROM and/or RAM used to store code, for example, used to direct the processor 922 to implement the methods illustrated in FIGS. 4-7. The storage 926 may include one or more hard drives, one or more optical drives, one or more flash drives, or any combinations thereof. The storage 926 may be used to provide storage for intermediate results, data, images, or code associated with operations, including code used to implement the methods of FIGS. 4-7.

The present techniques are not limited to the architecture of the cluster computer system 900 illustrated in FIG. 9. For example, any suitable processor-based device may be utilized for implementing all or a portion of embodiments of the present techniques, including without limitation personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

The invention claimed is:

1. A method for partitioning a reservoir, comprising:
   generating a representation of a topology graph of a simulation model in a non-transitory computer readable medium, wherein the topology graph comprises a plurality of elements and a plurality of connections between adjacent elements;
   weighting, using a computer, each of the plurality of connections to create a plurality of weights, wherein one or more of the plurality of weights are non-integers selected from any real values, wherein the plurality of elements comprise computational cells in a computational mesh and wherein the weighting of each of the plurality of connections is based, at least in part, on physical properties assigned to the computational cells, and wherein the physical properties comprise transmissibility, total mobility, mass flow, heat flow, or any combinations thereof;

scaling, using the computer, each of the plurality of weights, wherein the scaled plurality of weights are integer values, and wherein scaling comprises nonlinear monotone mapping the one or more non-integer weights into corresponding integer values;

partitioning, using the computer, the topology graph into two or more subdomains, wherein a partition boundary follows a local topographical minimum in the topology graph; and assigning a subdomain to each of a plurality of processors.

2. The method of claim 1, wherein the plurality of elements comprise rows in a linear system matrix and the plurality of connections correspond to nonzero elements of the matrix.

3. The method of claim 2, wherein the weighting of each of the plurality of connections is based at least in part on a plurality of off-diagonal coefficients in a Jacobian matrix representing a simulation model.

4. The method of claim 1, wherein the weighting of each connection of the plurality of connections is based, at least in part, upon the connection's proximity to a well bore.

5. The method of claim 1, wherein a near-well region is kept in one of the two or more subdomains.

6. The method of claim 1, wherein the weighting of each connection of the plurality of connections is based, at least in part, upon the connection's belonging to a grid block that is perforated by a well bore.

7. The method of claim 1, wherein the weighting of each of the plurality of connections is based, at least in part, upon a solution to a local flow problem.

8. The method of claim 1, wherein scaling each of the plurality of weights is performed using a probability distribution.

9. The method of claim 1, further comprising performing the simulation model for the subdomain assigned to each of the plurality of processors.

10. A system for modeling reservoir properties, comprising:
  a plurality of processors;
  a storage medium comprising a representation of a topology graph of a reservoir model, wherein the topology graph comprises a plurality of connections; and
  a machine readable medium comprising code configured to direct at least one of the plurality of processors to:
  weight each of the plurality of connections to create a plurality of weights, wherein one or more of the plurality of weights are non-integers selected from any real values, wherein each of the plurality of weights is based, at least in part, on an associated physical property, and wherein the physical property represents heat transfer, mass transfer, total flow, transmissibility, or any combinations thereof;
  nonlinear monotone map each of the plurality of weights to an integer value;
  partition the topology graph into two or more subdomains; and
  assign each of the two or more subdomains to a different processor selected from the plurality of processors.

11. The system of claim 10, wherein the plurality of processors comprises a cluster computing system.

12. A non-transitory computer readable medium comprising code configured to direct a processor to:
  create a topology graph of a simulation model, wherein the topology graph comprises a plurality of connections between the center points of adjacent computational cells in a computational mesh;
  weight each of the plurality of connections to create a plurality of weights, wherein one or more of the plurality of weights are non-integers selected from any real values, wherein each of the plurality of weights is based, at least in part, on an associated physical property, and wherein the physical property represents heat transfer, mass transfer, total flow, transmissibility, or any combinations thereof;
  scale each of the plurality of weights, wherein scaling comprises nonlinear monotone mapping the one or more non-integer weights into corresponding integer values;
  partition the topology graph into two or more subdomains, wherein a partition boundary follows a local topographical minimum in the topology graph; and
  assign each of the subdomains to a different processor selected from a plurality of processors.

13. The non-transitory computer readable medium of claim 12, comprising code configured to direct the processor to which the subdomain is assigned to process a simulation model for the subdomain.

14. The non-transitory computer readable medium of claim 12, comprising code configured to direct the processor to map the plurality of weights into an integer range.

* * * * *